May 31, 1960     L. C. VAN ATTA     2,939,134
RADIO SYSTEM AND METHOD FOR LOCATING ENEMY ARTILLERY
Filed March 4, 1946     3 Sheets-Sheet 1

INVENTOR.
LESTER C. VAN ATTA
BY
*Harry M. Saragovitz*
ATTORNEY

May 31, 1960 L. C. VAN ATTA 2,939,134
RADIO SYSTEM AND METHOD FOR LOCATING ENEMY ARTILLERY
Filed March 4, 1946 3 Sheets-Sheet 2
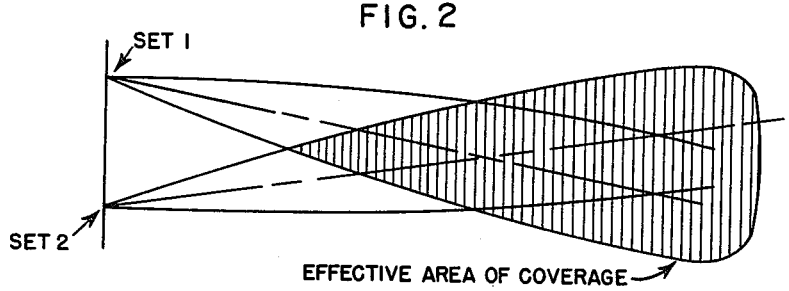
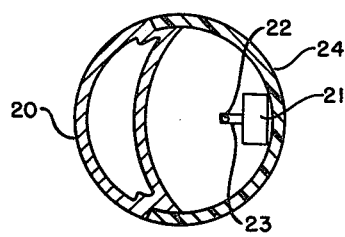
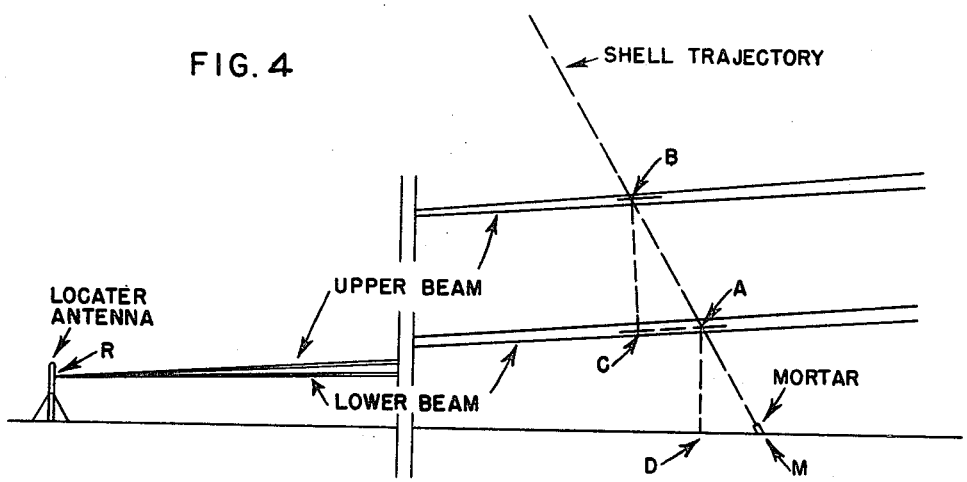
INVENTOR
LESTER C. VAN ATTA
BY
William D. Hall.
ATTORNEY May 31, 1960 L. C. VAN ATTA 2,939,134
RADIO SYSTEM AND METHOD FOR LOCATING ENEMY ARTILLERY
Filed March 4, 1946 3 Sheets-Sheet 3

INVENTOR
LESTER C. VAN ATTA
BY
William D. Hall.
ATTORNEY

United States Patent Office 2,939,134
Patented May 31, 1960

2,939,134
RADIO SYSTEM AND METHOD FOR LOCATING ENEMY ARTILLERY

Lester C. Van Atta, Winchester, Mass., assignor, by mesne assignments, to the United States of America as represented by the Secretary of War Filed Mar. 4, 1946, Ser. No. 651,927
7 Claims. (Cl. 343—13)

This invention relates in general to radio object locating systems, and, more particularly, to apparatus for determining the position of mortars from the trajectory of projectiles fired therefrom.

In the course of tactical military operations, one of the most effective and deadly types of enemy action encountered is mortar fire. The mortar's portability, simplicity, and capacity for placing shells behind obstacles sufficient to protect materiel and personnel against higher velocity projectiles make it of great importance in both offensive and defensive warfare. Accordingly, a means of defense against enemy mortars may be regarded as of high importance to ground troops.

Such a means of defense should be highly mobile since mortars need no fixed emplacements and can be readily dismounted and transported to a new location. Also, the defense means should be capable of being taken into rough terrain either by motor, or by being carried by a small number of men. A further desirable characteristic is simplicity, so that a minimum operating crew is necessary.

Accordingly, it is one object of my invention to provide a means of locating the origin of mortar fire.

Another object is to provide a simple and readily portable means of defense against mortars.

A further object is to provide a quick and reliable means for locating the origin of mortar fire.

In brief, my invention comprises apparatus for electronically observing mortar shells in flight and locating the position of the firing mortar by a process of triangulation. Two antennas, located a predetermined distance apart, emit beams of pulse modulated radiant energy which overlap above a suspected mortar location. The beams are thin vertically and relatively wide horizontally, hence the area of overlap is quite large. A mortar shell rising through the beams reflects energy to the antennas causing an indication to appear on a cathode ray oscilloscope in the form of two intersecting lines. The reflected signal also causes the beams to be shifted to a higher angle with the horizontal so that the mortar shell again passes through an overlapping area. The second cathode ray oscilloscope indication thus obtained, together with the previous one, enables the range of the mortar from each antenna to be determined by extrapolation. An accompanying artillery piece is then employed to silence the mortar.

The principles and operation of my invention will be more apparent to those skilled in the art upon reference to the following specifications, claims, and to the drawings in which:

Fig. 2 is a plan view of the area of overlap between the beams of the antennas shown in Fig. 1;

Fig. 3 is a cross-section through one of the antennas to show its construction;

Fig. 4 is a diagram illustrating the passage of a shell through the beams;

Figure 1:
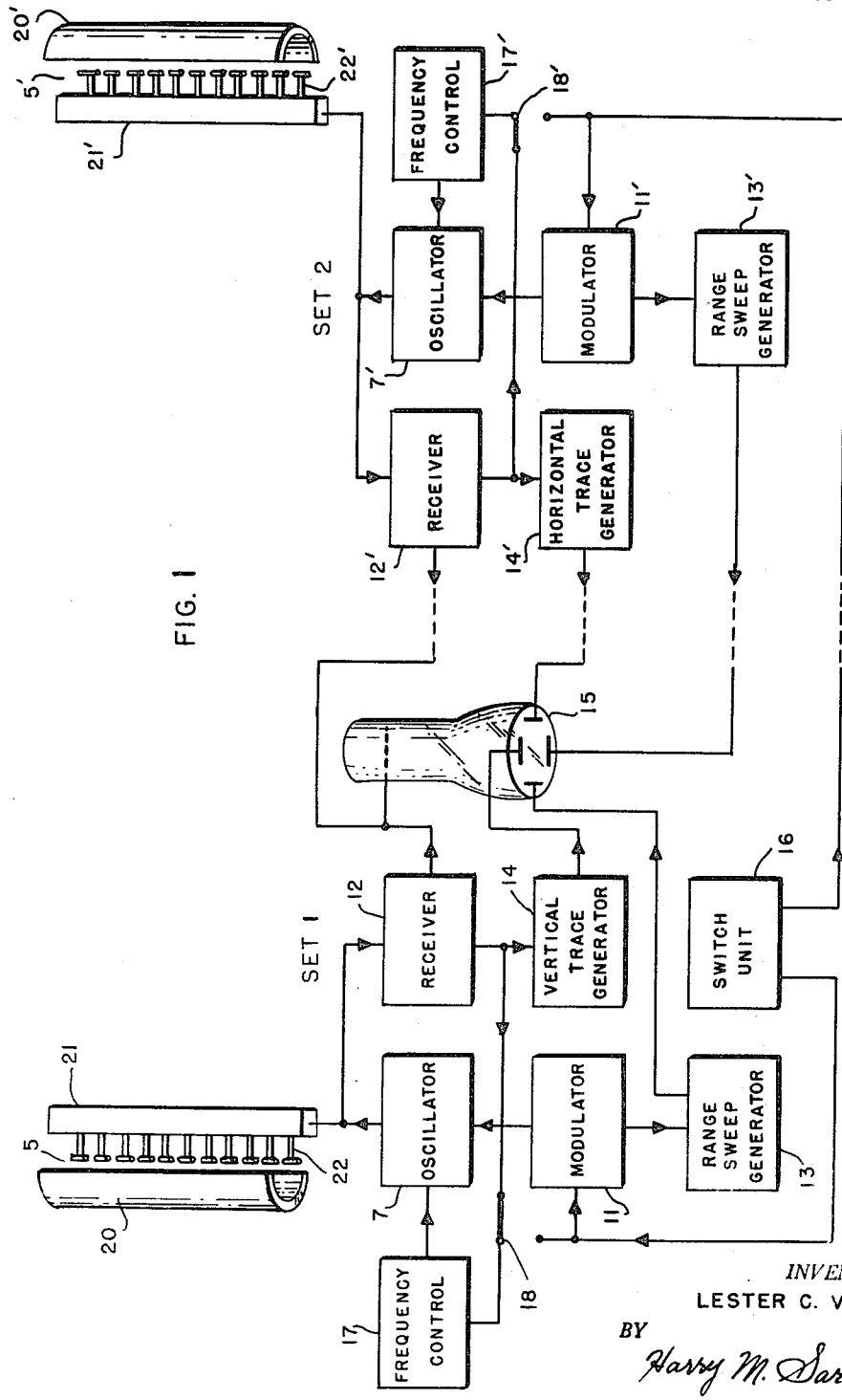
Fig. 1 is a block diagram of the above-mentioned detector units.

Each locater unit in the field comprises an antenna mounted on an antenna mast, a radio frequency oscillator which is detachably mounted at the upper end of mast, a truck containing the cathode ray indicator, the transmitter modulator and communication equipment for contact with other units, a cable interconnecting the equipment in the truck and the oscillator, and a generator which may be conveniently powered by a small gasoline motor to provide a primary source of electrical power for the equipment. The equipment contained in the truck is so constructed that it may be separated into smaller units, each of which may be transported on a man's back in terrain unsuitable for vehicular operation. The antenna and mast may also be made in several sections so that they may be carried by hand. It will be noted that the installation, due to its compactness, may be readily camouflaged, the projecting antenna being of such small cross-section as not to be readily discernible to enemy observers.

The radiated beams, for an illustrative embodiment of the invention in both upper and lower positions of the beams have a width of 20°, as measured from the line of direction of maximum energy to the points where the beam power has dropped to half its maximum value. The vertical thickness of the beams is approximately ½° as measured between half-power points. A normal value of elevation for the beams while in their lower position is 1¼°, while in the upper position they are elevated 2½° above the horizontal.

The area of overlap between the beams is shown in Fig. 2, which is a view of the combined radiation pattern from a point vertically above the beams. It should be noted that the outlines given in the figure are approximate only and that the area marked "effective area of coverage" is not necessarily limiting, it being possible under certain conditions to obtain fixes on mortars lying somewhat outside this area.

The shape of the beams is due to the construction of the antennas, each of which consists of a linear array of dipoles aligned in a vertical plane and backed by a parabolic reflector. A cross-section of one of the antennas is shown in Fig. 3, to which reference is now made, to illustrate this construction. A box girder 20 constructed of a light but strong material has one face formed into a concave parabolic surface to serve as a reflector of radiant energy. A wave guide 21 carrying oscillatory energy is mounted so as to extend substantially parallel to the parabolic surface. Along the length of wave guide 21 is spaced a plurality of dipole radiators 22 which are fed from the wave guide. These dipoles may be parallel to the axis of the girder. Each dipole is mounted on a supporting member 23. The wave transparent cover 24, which may be conveniently formed of a plastic material, is employed to protect the antenna and parabolic reflecting surface from damage by weather or physical blows. Since a number of dipoles are stacked in the vertical plane, the thickness of the radiated beam will be small, as is well known to those skilled in the art. The horizontal width of the beam, however, is chiefly dependent upon the physical dimensions of the parabolic reflector and the position of the linear array with respect thereto. The relative phases of the driving voltages applied to the dipoles determines the angle of elevation of the radiated beam. To effect the switching between low and high beam positions, the operating frequency of the R.-F. oscillator is slightly changed. The change in wavelength of the energy in the wave guide alters the phase in which each dipole, mounted in a fixed position on the guide, is fed. To allow adaptation of the beam elevation to varying terrain conditions it is possible to incorporate a means of tuning the oscillator by hand, as well as the automatic switching tuning.

Although in one embodiment the antennas have had a length of 15 feet exclusive of the mast, by use of a construction as described above the structure can withstand a 30 mile wind, even though the antenna and its supporting structure together weigh only approximately 50 pounds.

The effects of a mortar shell passing through the beams can best be described with reference to Fig. 4. The upper and lower positions of one of the beams are shown, as are the locater antenna and the mortar. The figure has been exaggerated in certain respects, such as the sizes of the antenna and the mortar and the angles of elevation, in order to illustrate the operation more clearly. When the mortar is fired, the shell describes a path which is indicated in part by the dotted line labeled "shell trajectory." As is well known, this trajectory will be substantially parabolic, subject to the effects of wind, air resistance, and the like; however, during its early portion, it may be approximated by a straight line without serious deviation from the actual path. This assumption is made in the design and operation of the locater apparatus, and it has been found that the error introduced thereby is negligible. The shell takes approximately $1/15$ second to pass through the lower beam position, during which time a portion of the pulsed energy radiated from the antenna is reflected from the metallic substance of the shell, and is received at the antenna to be applied to a visual indicating system as will be described hereinafter. Reception of this reflected energy may also be employed to redirect the beam to its upper position, or a system of alternately switching the beam up and down in a regular sequence may be employed. The former method is advantageous in that a descending shell from a friendly source will register on the visual indicator only once and, therefore, may be distinguished from shells emanating from enemy positions. The time required to switch the beam to its upper position is less than that required for the shell to travel the additional distance and, therefore, the shell will again reflect energy to the antenna from a point closer to the locater. Point A designates the intersection of the shell trajectory with the center line of the lower beam position; point B designates the intersection with the upper beam position. If a perpendicular is dropped from point B to the lower beam at point C, it can be seen that the difference in range measurements between the two shell positions, as measured from the antenna R, is equal to the distance A—C. The distance A—C also represents a difference in the time of travel of a radio signal from R to A and B and return. This time disparity is retranslated into a linear difference on the cathode ray tube indicator screen by means similar to those employed in other radio object locating systems which include such visual indication. Examination of the triangles BCA and ADM, and consideration of their geometry, will show that for angles of elevation of the order of 2°, hypotenuses AB and AM are substantially equal, hence AC will be approximately the same length as MD. This fact facilitates extrapolation from the known shell positions to the unknown mortar location.

Figure 5:
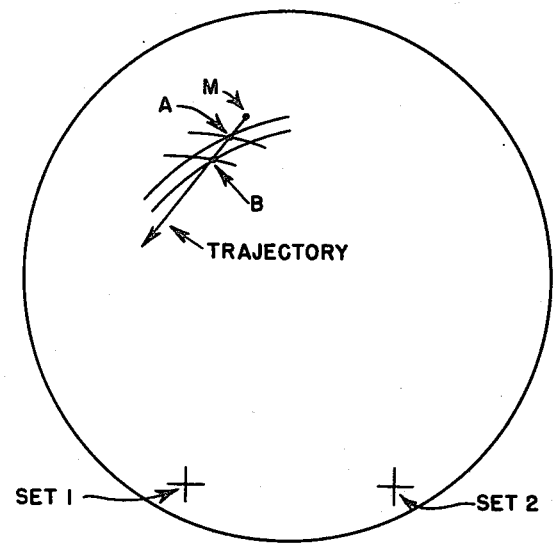
Fig. 5 is a view of a cathode ray oscilloscope screen showing one type of visual indication which may be employed.

One type of cathode ray tube display which may be utilized is shown in Fig. 5. In this type of presentation, the electron beam within the tube has two resting places, each corresponding to the location of one of the transmitting and receiving antennas as indicated by the legends "Set 1" and "Set 2." The transmitters may operate either simultaneously or alternately, in the latter case switching being performed 30 to 60 times per second. Since, by using a single indicator located at one of the transmitting stations, one man may make the necessary observations and extrapolations, it is necessary to connect the sets by a cable over which echo signals are sent from the set without an indicator to the indicator position. When a pulse signal is transmitted from Set 1, the electron beam is moved radially outward in the direction of the radiated beam from the appropriate resting position, marked Set 1, by a suitable linear range sweep deflecting voltage. The beam normally makes no illuminated trace on the face of the tube since the control grid of the tube is held slightly below cut-off potential. An echo indication, in the form of a positive-going voltage pulse, is applied to the control grid and causes a visible trace to appear on the screen of the tube when the sweep voltage has displaced the spot from its resting position a distance proportional to the range of the target. If the sets are being used alternately for $1/60$ second, and the transmitted signal is modulated at a rate of 6000 pulses per second, these being normal values, 100 consecutive indications will be received from each set. These will be spread out on an arc by other deflecting voltages which rotate the sweep through 20° about the position of Set 1 during this period. Next, the echo signal from the second set will be used to modulate the beam, the sweeps centering on the position of Set 2 and being rotated about this point by a fourth set of deflecting voltages. Since the mortar shell will remain in the beam at least $1/15$ second, the arcs about each set will be traced at least twice. The intersection A of these two arcs locates the shell in range as it passes through the lower beam. When the shell passes through the upper beam a similar pair of arcs defines a second position B of the shell. It can be seen that the projection of the shell's trajectory may be represented by a line through the two points of intersection, which line also contains the mortar location. As was shown in connection with Fig. 4, the range difference between the two points of intersection will closely approximate the range distance between the first point of intersection and the mortar, hence the mortar location can easily be obtained by extrapolation of the trajectory line to a point M an appropriate distance behind the first intersection point.

While this type of visual presentation minimizes distortion in the graphical representation, the generation of proper deflecting voltages presents considerable difficulty, in view of the fact that the base line is not fixed in length and is subject to tactical and terrain limitations. Therefore, a presentation in Cartesian coordinates, rather than polar coordinates, has been found more useful. While this type of indication may not be as accurate as the foregoing, the additional error introduced is negligible.

Figure 6:
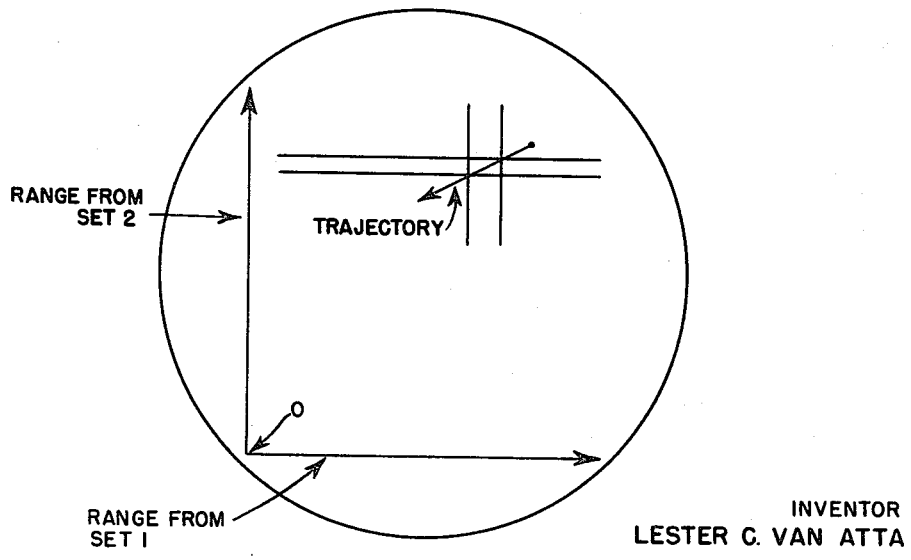
Fig. 6 is a view of a cathode ray oscilloscope face showing a second and simpler type of visual indication from which extrapolation may be made.

Fig. 6 is illustrative of a Cartesian system of presentation. A single resting point O is necessary. When a pulse is transmitted from Set 1, the electron beam is moved toward the right along the abscissa of the coordinates by a sawtooth voltage applied to the horizontal deflecting plates. No visible trace is as yet produced. Upon reception of an echo signal, the control grid of the cathode ray tube is raised above cut-off and a vertical trace voltage is applied to the vertical deflecting plates to produce a visible, straight, vertical trace. The beam then returns to point O, and a similar procedure is followed to produce a horizontal trace from an echo signal from Set 2. In like fashion, a second intersection point is obtained from the high beam position, and extrapolation is carried out as described hereinabove to determine the range of the mortar origination point from the transmitters. When the range of the mortar from both transmitters is known, the geographical position of the mortar can readily be determined by use of a compass on an artillery map. In carrying out this construction on the map, the operator performs a function which in the indicator of Fig. 5 is performed automatically. Instead of adjusting deflecting voltages to compensate for a different length baseline, the operator has only to change the points in the map from which measurements are made.

The system may also be used, particularly if continuous switching between high and low beams is employed, to spot friendly counter fire against the mortar position. Hence, corrections to poorly aimed counter fire may be given the artillery commander quickly and accurately.

The complete system is illustrated in block diagram in Fig. 1. The two spaced units are indicated as Set 1 and Set 2, respectively, both of the units being interconnected by means of a cable indicated by the dotted lines. Since both sets are similar, except for certain components which are common to both, only Set 1 need be described in detail, it being understood that the components of Set 2 indicated by the primed reference numerals, are identical in structure and function to the components indicated by the same, but unprimed, reference numerals of Set 1.

Set 1 includes an antenna 5 comprising a vertical dipole array and reflector 20. A wave guide 21 connects the dipoles to a transmitting oscillator 7 which is repetitively pulsed by a modulator 11 which is repetitively energized by a switch unit 16, which is a generator of spaced pulses of suitable repetition rate and duration. A frequency control means 17 is coupled to oscillator 7 to periodically shift the frequency of the oscillator thereby to shift the lobe of the antenna pattern.

The echoes picked up by antennas 5 and 5' are applied to receivers 12 and 12', and the outputs of both receivers are applied to the intensity grid of an oscilloscope 15. The output of vertical trace generator 14 is applied to the vertical deflecting plates of the oscilloscope, and the output of horizontal trace generator 14' is applied to the horizontal trace generator. When an echo is received on Set 1, the grid of the oscilloscope is raised above cutoff, and the voltage from generator 14 produces a straight line vertical trace. Similarly, a horizontal trace is produced by generator 14 when an echo is received by Set 2.

The pulses in the outputs of modulators 11 and 11' are applied to range sweep generators 13 and 13', respectively. The output of generator 13 is applied to the horizontal deflecting plates of the oscilloscope, and the output of generator 13' is applied to the vertical deflecting plates.

The outputs of receivers 12 and 12' are applied to frequency controls 17 and 17' when two position switches 18 and 18' are in the upper position as shown, so that the antenna lobes are shifted when the first echo is received. When the switches are in the lower position both frequency controls are periodically operated under the control of switch unit 16 so that the antenna lobes are periodically shifted up and down.

The system described provides sufficient accuracy in performance with an absolute minimum of equipment. It is possible to accomplish spotting of shells with object locating systems using an antenna which is moved to scan a given area. However, the bulk and weight of the scanning and synchronization apparatus is such as seriously to reduce the mobility of the set.

While there has been described hereinabove what is at present considered to be a preferred embodiment of the present invention, it will be obvious to those skilled in the art that changes and modifications may be made therein without departing from the inventive concept.

What is claimed is:

1. Apparatus for determining the location of an artillery piece firing a projectile comprising a first radiator of electromagnetic energy, first means for generating oscillatory energy and supplying said energy to said first radiator, the radiated energy being in the shape of a beam vertically thin and horizontally thick, second energy generating means and a second radiator spaced apart from said first generating means and radiator by a predetermined distance and having characteristics substantially similar to said first generating means and radiator, means for directing the beams of energy from said first and second radiators through a given region over the artillery location, means coupled to said radiators for altering the angle of elevation of both beams simultaneously by a similar amount, means associated with each of said radiators for receiving energy reflected from the projectile originating at said artillery piece and passing through the beams at two different angles of elevation of each of said beams, and means comprising a single indicator operatively connected to both of said receiving means for determining the range of the projectile for each angle of elevation of said beams.

2. Apparatus in accordance with claim 1 wherein there is provided in addition means coupled to said radiators and receiving means for altering the angle of elevation of the beams in response to an echo signal.

3. Apparatus in accordance with claim 1 wherein in addition said means for determining the range of the projectile includes cathode ray tube means.

4. Apparatus for determining the location of an artillery piece comprising a first radiator of a beam of electromagnetic energy, first generator means for generating oscillatory energy and supplying said energy to said first radiator, second generator means and a second radiator similar to said first generator means and radiator spaced apart from said first generator means and radiator by a predetermined distance, means for directing the radiated beams of energy from said radiators through a given region over the location of the artillery piece, means coupled to said radiators for increasing the angle of elevation of both beams within a time less than that required for a projectile from said artillery piece to pass from the position of the beams at their lower elevation to the position of the beams at their higher elevation means associated with each of said radiators for receiving energy reflected from a projectile originating at said artillery piece and passing through the beams at their two different angles of elevation, and means comprising a single cathode ray tube for indicating reflected energy received on both radiators for determining the range of the projectile from each radiator for each angle of elevation of said beams.

5. The method of locating the point of origin of a projectile from an artillery piece comprising the steps of radiating broad, flat beams of pulse-modulated radio signals at very low angles of elevation from two physically distant stations into substantially the same space in a region over the location of the artillery piece, receiving at each radiating station echo signals reflected from the projectile rising through the overlapping beams, slightly elevating the beams simultaneously to a predetermined higher angle of elevation within a time less than that required for the projectile to pass from the lower to the higher positions of said beams so that the projectile will again pass through the beams to produce a second set of reflections, applying voltages developed from said first and second sets of reflections to a cathode ray tube so that each set of reflections make visible a pair of intersecting lines on the screen of said tube, the points of intersection of said lines being spaced apart from two reference marks on the face of the tube a distance substantially proportional to the ranges from the two stations to the projectile, and extrapolating on a straight line joining the two points of intersection a distance substantially equal to the ratio between the two angles of elevation times the distance between the intersection points to find the ranges from each station to the origin of the projectile.

6. The method of locating the point of origin of a projectile comprising the steps of radiating broad, flat beams of pulse-modulated radio signals at a very low angle of elevation from two physically distant stations into substantially the same space in a region over the point of origin of the projectile, receiving at each radiating station echo signals reflected from the projectile rising through the overlapping beams, elevating the beams simultaneously to twice said low angle of elevation within a time less than that required for the projectile to pass from the lower to the higher positions of said beams so that the projectile will again pass through the beams to produce a second set of reflections, depicting the range of each radiating station from the projectile at each of its passages through the beams, plotting said intersection points graphically in relation to the location of said transmitters, and extrapolating on a straight line joining the two points of intersection a distance substantially equal to the distance between the intersection points to find the ranges from each station to the origin of the projectile.

7. The method of locating the point of origin of an object describing a trajectory in space comprising the steps of radiating broad, flat beams of pulse-modulated radio signals at a very low angle of elevation from a pair of physically separated stations into substantially the same space in a region near said origin, receiving at each radiating station echo signals reflected from the object passing through the overlapping beams, approximately doubling the angle of elevation of the beams within a time less than that required for the projectile to pass from the lower to the higher positions of said beams so that the object will again pass through the beams to produce at least one additional set of reflections, applying voltages developed from said sets of reflections to a cathode ray tube, causing each set of reflections to make visible on the screen of said tube a pair of lines intersecting at a point spaced from reference marks on the face of the tube by distances substantially proportional to the ranges from the stations to the moving object, and extropolating on a straight line joining the points of intersection a distance substantially equal to the distance between consecutive intersection points to find the ranges from each station to the origin of the object.

References Cited in the file of this patent

UNITED STATES PATENTS

| | | |
|---|---|---|
| 2,399,017 | Goldman | Apr. 23, 1946 |
| 2,409,462 | Zworykin | Oct. 15, 1946 |
| 2,426,460 | Lewis | Aug. 26, 1947 |
| 2,433,804 | Wolff | Dec. 30, 1947 |
| 2,470,787 | Nosker | May 24, 1949 |
| 2,515,332 | Budenbom | July 18, 1950 |
| 2,586,783 | Busignies | Feb. 26, 1952 |